US012791364B2

(12) United States Patent
Thomsson et al.

(10) Patent No.: US 12,791,364 B2
(45) Date of Patent: Nov. 10, 2026

(54) SELF-CLEANING SENSOR WINDOW DEVICES FOR MINE SITE EQUIPMENT AND ASSOCIATED SYSTEMS AND METHODS

(71) Applicant: MineSense Technologies Ltd., Vancouver (CA)

(72) Inventors: Daniel Thomsson, Burnaby (CA); Manikaran Singh, Surrey (CA)

(73) Assignee: MineSense Technologies Ltd., Vancouver (CA)

( * ) Notice: Subject to any disclaimer, the term of this patent is extended or adjusted under 35 U.S.C. 154(b) by 654 days.

(21) Appl. No.: 17/992,657

(22) Filed: Nov. 22, 2022

(65) Prior Publication Data

US 2023/0160727 A1 May 25, 2023

Related U.S. Application Data

(60) Provisional application No. 63/281,929, filed on Nov. 22, 2021.

(51) Int. Cl.
*G01D 11/26* (2006.01)
*G01D 11/24* (2006.01)

(52) U.S. Cl.
CPC ........... *G01D 11/245* (2013.01); *G01D 11/26* (2013.01)

(58) Field of Classification Search
CPC .............................. G01D 11/245; G01D 11/26
See application file for complete search history.

(56) References Cited

U.S. PATENT DOCUMENTS 719,343 A 1/1903 Langerfeld
3,049,308 A 8/1962 Lang
(Continued)

FOREIGN PATENT DOCUMENTS

AU 2006249259 6/2007
CA 2629408 11/2009
(Continued)

OTHER PUBLICATIONS

Bamber, Andrew Sherliker, "Integrated Mining, Pre-Construction and Waste Disposal Systems for the Increased Sustainability of Hard Rock Metal Mining," Apr. 2008, pp. 29, 37-44, 85-89. <https://circle.ubcca/handle/2429/779>.
(Continued)

*Primary Examiner* — Jamel E Williams
(74) *Attorney, Agent, or Firm* — Taft Stettinius & Hollister LLP; John H. Allie

(57) ABSTRACT

Self-cleaning sensor window devices for mine site equipment and associated systems and methods are disclosed herein. In some embodiments, a self-cleaning sensor system includes a sensor housing having an opening, a sensor carried by the sensor housing, a self-cleaning window device coupled to the sensor enclosure and positioned at least partially within the opening. The self-cleaning window device comprises a window positioned forward of the sensor to allow the sensor to transmit and/or receive signals through the window, a cleaning assembly directed toward the window and configured to clean debris from the front surface of the window, and a controller operably coupled to the cleaning assembly. The controller can transmit control signals to the cleaning assembly to initiate cleaning of the front surface of the window.

48 Claims, 6 Drawing Sheets

(56) References Cited

U.S. PATENT DOCUMENTS

| | | | | |
|---|---|---|---|---|
| 3,209,910 | A | 10/1965 | Palmer | |
| 3,263,160 | A | 7/1966 | Dolan et al. | |
| 3,337,328 | A | 8/1967 | Lawver | |
| 3,655,964 | A | 4/1972 | Slight | |
| 3,701,419 | A | 10/1972 | Hutter | |
| 3,747,755 | A | 7/1973 | Senturia et al. | |
| 4,006,481 | A | 2/1977 | Young et al. | |
| 4,030,026 | A | 6/1977 | Payne | |
| 4,128,803 | A | 12/1978 | Payne | |
| 4,236,640 | A | 12/1980 | Knight | |
| 4,241,835 | A | 12/1980 | Lockett | |
| 4,300,097 | A | 11/1981 | Turner | |
| 4,361,238 | A | 11/1982 | Kealy et al. | |
| 4,365,719 | A | 12/1982 | Kelly | |
| 4,441,616 | A | 4/1984 | Konig et al. | |
| 4,507,612 | A | 3/1985 | Payne | |
| 4,600,356 | A | 7/1986 | Bridges et al. | |
| 4,659,989 | A | 4/1987 | Kerr | |
| 4,909,930 | A | 3/1990 | Cole | |
| 5,197,607 | A | 3/1993 | Hakansson | |
| 5,236,092 | A | 8/1993 | Krotkov | |
| 5,285,972 | A | 2/1994 | Notebaart | |
| 5,413,222 | A | 5/1995 | Holder | |
| 5,523,690 | A | 6/1996 | Rowan | |
| 5,592,092 | A | 1/1997 | Mechler | |
| 5,813,543 | A | 9/1998 | Gesing et al. | |
| RE36,537 | E | 2/2000 | Sommer et al. | |
| 6,078,018 | A | 6/2000 | Davis et al. | |
| 6,140,643 | A | 10/2000 | Brown | |
| 6,444,936 | B1 | 9/2002 | Ludwig et al. | |
| 6,545,240 | B2 | 4/2003 | Kumar | |
| 6,664,914 | B2 | 12/2003 | Longstaff et al. | |
| 6,693,274 | B2 | 2/2004 | Baird | |
| 6,753,957 | B1 | 6/2004 | Graft et al. | |
| 6,817,474 | B2 | 11/2004 | Ikeda | |
| 7,161,672 | B2 | 1/2007 | Gronushkin et al. | |
| 7,430,273 | B2 | 9/2008 | Yellepeddi | |
| 7,564,943 | B2 | 7/2009 | Sommer et al. | |
| 7,574,821 | B2 | 8/2009 | Furem | |
| 7,595,489 | B2 | 9/2009 | Statham | |
| 7,737,379 | B2 | 6/2010 | Witdouck | |
| 7,763,820 | B1 | 7/2010 | Sommer et al. | |
| 7,786,401 | B2 | 8/2010 | Valerio | |
| 7,797,861 | B2 | 9/2010 | Wright | |
| 7,909,169 | B1 | 3/2011 | Slade | |
| 7,948,237 | B2 | 5/2011 | Kuzmin et al. | |
| 7,965,167 | B2 | 6/2011 | Volker et al. | |
| 7,970,574 | B2 | 6/2011 | Jin | |
| 8,100,581 | B2 | 1/2012 | Djordjevic | |
| 8,138,437 | B2 | 3/2012 | Valerio | |
| 8,315,838 | B2 | 11/2012 | Durrant-Whyte | |
| 8,446,156 | B2 | 5/2013 | Morrison | |
| 8,476,545 | B2 | 7/2013 | Sommer | |
| 8,494,220 | B2 | 7/2013 | Del Grande | |
| 8,515,008 | B2 | 8/2013 | Ulberg et al. | |
| 8,600,545 | B2 | 12/2013 | Earlam | |
| 8,664,595 | B2 | 3/2014 | Buhot et al. | |
| 8,766,129 | B2 | 7/2014 | Kazakov et al. | |
| 8,812,149 | B2 | 8/2014 | Doak | |
| 8,820,533 | B2 | 9/2014 | Shaw et al. | |
| 8,841,571 | B2 | 9/2014 | Tavakkoli | |
| 8,843,266 | B2 | 9/2014 | Lindskov | |
| 8,855,809 | B2 | 10/2014 | Spencer et al. | |
| 8,875,901 | B2 | 11/2014 | Wellwood et al. | |
| 8,908,829 | B2 | 12/2014 | Watanabe et al. | |
| 8,931,720 | B2 | 1/2015 | Box et al. | |
| 8,937,282 | B2 | 1/2015 | Owen et al. | |
| 8,957,340 | B2 | 2/2015 | Wellwood et al. | |
| 8,958,905 | B2 | 2/2015 | Bamber et al. | |
| 9,010,543 | B2 | 4/2015 | Box et al. | |
| 9,114,433 | B2 | 8/2015 | Roos et al. | |
| 9,237,284 | B2 | 1/2016 | Hogasten | |
| 9,278,670 | B2 | 3/2016 | Hattori et al. | |
| 9,290,913 | B2 | 3/2016 | Bamber et al. | |
| 9,314,823 | B2 | 4/2016 | Bamber et al. | |
| 9,316,537 | B2 | 4/2016 | Bamber et al. | |
| 9,604,826 | B2 | 3/2017 | Fretz | |
| 9,764,361 | B2 | 9/2017 | Valerio | |
| 9,785,851 | B1 | 10/2017 | Torek | |
| 9,884,346 | B2 | 2/2018 | Bamber et al. | |
| 9,958,407 | B2 | 5/2018 | Bamber et al. | |
| 10,029,284 | B2 | 7/2018 | Bamber et al. | |
| 10,036,142 | B2 | 7/2018 | Bamber et al. | |
| 10,053,327 | B2 | 8/2018 | Leslie et al. | |
| 10,054,560 | B2 | 8/2018 | Bamber et al. | |
| 10,259,015 | B2 | 4/2019 | Bamber et al. | |
| 10,450,172 | B1 | 10/2019 | Shaui | |
| 10,493,494 | B2 | 12/2019 | Bamber et al. | |
| 10,857,568 | B2 | 12/2020 | Bamber et al. | |
| 10,982,414 | B2 | 4/2021 | Bamber et al. | |
| 11,066,048 | B2 * | 7/2021 | Gu | B60S 1/488 |
| 11,219,927 | B2 | 1/2022 | Bamber et al. | |
| 11,247,240 | B2 | 2/2022 | Bamber et al. | |
| 11,247,241 | B2 | 2/2022 | Bamber et al. | |
| 2003/0009286 | A1 | 1/2003 | Shibusawa | |
| 2004/0066890 | A1 | 4/2004 | Dalmijn et al. | |
| 2005/0002029 | A1 | 1/2005 | Gornushkin et al. | |
| 2005/0150141 | A1 | 7/2005 | Suzik | |
| 2005/0150844 | A1 | 7/2005 | Hyndman | |
| 2005/0242006 | A1 | 11/2005 | Bohlig | |
| 2006/0090379 | A1 | 5/2006 | Furem | |
| 2006/0171504 | A1 | 8/2006 | Sommer et al. | |
| 2007/0030953 | A1 | 2/2007 | Sommer et al. | |
| 2007/0295590 | A1 | 12/2007 | Weinberg | |
| 2008/0047170 | A1 | 2/2008 | Nichols | |
| 2008/0192987 | A1 | 8/2008 | Helgason et al. | |
| 2009/0076674 | A1 | 3/2009 | Kiegeral et al. | |
| 2009/0256412 | A1 * | 10/2009 | Nieto | E21C 41/26<br>382/109 |
| 2009/0322357 | A1 | 12/2009 | Beaulieu | |
| 2010/0005926 | A1 | 1/2010 | Valerio | |
| 2010/0091103 | A1 | 4/2010 | Peltonen et al. | |
| 2011/0066404 | A1 | 3/2011 | Salazar-Tio et al. | |
| 2011/0168962 | A1 | 7/2011 | Yang et al. | |
| 2011/0186660 | A1 | 8/2011 | Harding et al. | |
| 2011/0313625 | A1 | 12/2011 | Miller et al. | |
| 2012/0033212 | A1 | 2/2012 | Barefield | |
| 2012/0046983 | A1 | 2/2012 | Nettleton et al. | |
| 2012/0148018 | A1 | 6/2012 | Sommer, Jr. | |
| 2013/0026263 | A1 | 1/2013 | Bamber et al. | |
| 2013/0098807 | A1 | 4/2013 | Wellwood et al. | |
| 2013/0126399 | A1 | 5/2013 | Wolff | |
| 2013/0169961 | A1 | 7/2013 | Kraft | |
| 2013/0201481 | A1 | 8/2013 | Bamber et al. | |
| 2013/0272829 | A1 | 10/2013 | Innes et al. | |
| 2013/0292307 | A1 | 11/2013 | Bamber et al. | |
| 2013/0313169 | A1 | 11/2013 | Lapeyre et al. | |
| 2013/0346127 | A1 | 12/2013 | Jensen | |
| 2014/0088876 | A1 | 3/2014 | Shiley et al. | |
| 2014/0112749 | A1 | 4/2014 | Doll et al. | |
| 2014/0144342 | A1 | 5/2014 | Bye | |
| 2014/0200054 | A1 | 7/2014 | Fraden | |
| 2014/0225416 | A1 | 8/2014 | Harding et al. | |
| 2014/0260801 | A1 | 9/2014 | Wellwood et al. | |
| 2015/0004574 | A1 | 1/2015 | Bomer | |
| 2015/0085123 | A1 | 3/2015 | Tafazoli | |
| 2015/0108258 | A1 | 4/2015 | Bamber et al. | |
| 2015/0122705 | A1 | 5/2015 | Latti | |
| 2015/0343999 | A1 | 12/2015 | Lopez Galera et al. | |
| 2016/0054044 | A1 | 2/2016 | Jeong et al. | |
| 2016/0088240 | A1 | 3/2016 | Kostrzewa et al. | |
| 2016/0103316 | A1 | 4/2016 | Rousseau | |
| 2016/0107197 | A1 | 4/2016 | Hartmann | |
| 2016/0299116 | A1 | 10/2016 | Talmaki | |
| 2017/0037594 | A1 | 2/2017 | Wada | |
| 2017/0121945 | A1 | 5/2017 | Bamber et al. | |
| 2017/0239693 | A1 * | 8/2017 | Nabavi | B08B 1/16 |
| 2019/0041234 | A1 | 2/2019 | Ghannam | |
| 2019/0071845 | A1 | 3/2019 | Lindskov | |
| 2020/0123732 | A1 | 4/2020 | Hall et al. | |
| 2020/0230659 | A1 | 7/2020 | Nabavi | |
| 2021/0260628 | A1 | 8/2021 | Bamber et al. | |

(56) References Cited

U.S. PATENT DOCUMENTS

2021/0340733 A1* 11/2021 Bamber ................ G01N 33/24
2023/0160182 A1 5/2023 Thomsson et al.
2023/0243650 A1 8/2023 Thomsson et al.

FOREIGN PATENT DOCUMENTS

| | | | |
|---|---|---|---|
| CA | 2840545 | 1/2013 | |
| CN | 108017002 | 5/2018 | |
| CN | 111391791 | 7/2020 | |
| CN | 112246777 | 1/2021 | |
| CN | 216711399 | 6/2022 | |
| DE | 3228447 | 4/1986 | |
| EP | 2141414 | 1/2010 | |
| FR | 765387 | 6/1934 | |
| GB | 2188727 | 10/1987 | |
| JP | S5389701 | 7/1978 | |
| JP | S62202131 | 9/1987 | |
| JP | H0742201 | 2/1995 | |
| KR | 101402667 | 6/2014 | |
| WO | WO9530880 | 1/1995 | |
| WO | WO9922870 | 5/1999 | |
| WO | WO2005085968 | 2/2006 | |
| WO | WO2008046136 | 4/2008 | |
| WO | WO2008129115 | 10/2008 | |
| WO | WO2009076674 | 6/2009 | |
| WO | WO2010028446 | 3/2010 | |
| WO | WO2011116417 | 9/2011 | |
| WO | WO2011120086 | 10/2011 | |
| WO | WO2011134009 | 11/2011 | |
| WO | WO2011150464 | 12/2011 | |
| WO | WO2013001364 | 1/2013 | |
| WO | WO2013016774 | 2/2013 | |
| WO | WO2013033572 | 3/2013 | |
| WO | WO2013163756 | 11/2013 | |
| WO | WO-2014016975 A1 * | 1/2014 | .............. B60S 1/566 |
| WO | WO2016008059 | 1/2016 | |
| WO | 2018231070 | 12/2018 | |
| WO | 2021119813 | 6/2021 | |
| WO | WO-2021119813 A1 * | 6/2021 | ........... G06T 7/0004 |

OTHER PUBLICATIONS

Examination Report for Australian Patent Application 2012277493; mailed Jul. 8, 2016, 4 pages.
Examination Report for Australian Patent Application 2013255048; mailed Jan. 21, 2016, 3 pages.
Examination Report for Australian Patent Application 2013255051; mailed Jan. 27, 2016, 3 pages.
Examination Report for Australian Patent Application 2017201320; mailed Mar. 28, 2018, 4 pages.
Examination Report for Australian Patent Application 2020202849; mailed Jun. 10, 2021, 6 pages.
Examination Report for Australian Patent Application No. 2022202912; mailing date Jun. 17, 2022, 3 pages.
Examination Report for Australian Patent Application No. 2015292228, mailing date Oct. 4, 2017, 4 pages.
Examination Report for Australian Patent Application No. 2015292229, mailing date Apr. 3, 2018, 6 pages.
Examination Report for Australian Patent Application No. 2015292229, mailing date Oct. 13, 2017, 4 pages.
Examination Report for Australian Patent Application No. 2016216528, mailed Nov. 2, 2017, 5 pages.
Examination Report for Australian Patent Application No. 2017202941, mailed Jan. 12, 2018, 2 pages.
Examination Report for Australian Patent Application No. 2018203576, mailed Jul. 30, 2019, 7 pages.
Examination Report for Australian Patent Application No. 2018204838, mailed Aug. 8, 2019, 4 pages.
Examination Report for Australian Patent Application No. 2018214109, mailed Oct. 9, 2019, 3 pages.
Examination Report for Australian Patent Application No. 2018241197, mailed Nov. 14, 2019, 5 pages.
Examination Report for Australian Patent Application No. 2019204043, mailed May 17, 2020, 5 pages.
Examination Report for Australian Patent Application No. 2020273300; mailed Oct. 23, 2021, 5 pages.
Examination Report for Canadian Patent Application 2,840,545; mailed Mar. 23, 2016, 3 pages.
Examination Report for European Patent Application No. 15824840.1, mailed Feb. 23, 2022, 3 pages.
Examination Report for European Patent Application No. 12803664.7, mailed Apr. 8, 2019, 7 pages.
Examination Report for European Patent Application No. 13784189.6, mailed Apr. 23, 2019, 3 pages.
Examination Report for European Patent Application No. 13784899.0, mailed Jun. 20, 2017, 3 pages.
Examination Report for European Patent Application No. 15824840.1, mailed Nov. 3, 2020, 4 pages.
Examination Report for European Patent Application No. 15824840.1, mailed Nov. 6, 2019, 6 pages.
Examination Report for European Patent Application No. 15824840.1, mailed Sep. 8, 2021, 5 pages.
Examination Report for European Patent Application No. 15824911.0, mailed Jul. 18, 2019, 5 pages.
Examination Report for European Patent Application No. 18166364.2, mailed Nov. 6, 2019, 3 pages.
Examiner's Requisition for Canada Patent Application No. 2,955,636, mailed Nov. 2, 2021, 4 pages.
Examiner's Requisition for Canada Patent Application No. 2,955,693; mailed Sep. 22, 2021, 5 pages.
Extended European Search Report for European Application No. 12803664.7; mailed Feb. 10, 2016, 17 pages.
Extended European Search Report for European Application No. 13784189.6; mailed Nov. 5, 2015, 7 pages.
Extended European Search Report for European Application No. 13784899.0; mailed Jun. 10, 2016, 11 pages.
Extended European Search Report for European Application No. 15824911.0, mailed Jan. 31, 2018, 10 pages.
Extended European Search Report for European Application No. 20165382.1; mailed Jul. 27, 2020, 9 pages.
Extended European Search Report for European Patent Application No. 15824840.1, mailed Mar. 8, 2018, 5 pages.
Extended European Search Report for European Patent Application No. 18166364.2, mailed Jul. 10, 2018, 6 pages.
Extended European Search Report for European Patent Application No. 20160983.1, mailed Oct. 2, 2020, 7 pages.
First Office Action in Chilean Patent Application No. 2017-00150; mail date Jun. 20, 2018, 7 pages.
First Office Action in Chinese Patent Application 201580050856.21; mail date May 3, 2018, 23 pages, with English translation.
First Office Action in Chinese Patent Application 201580050857.7; mail date Dec. 5, 2018, 9 pages, with English translation.
First Office Action in Chinese Patent Application 201910037844.6; mail date Sep. 27, 2020, 11 pages.
First Official Action in Chilean Patent Application 2924-2014, Mail Date Oct. 29, 2014, 5 pages.
First Official Action in Chilean Patent Application 2925-2014, Mail Date Oct. 29, 2014, 5 pages.
International Search Report and Written Opinion for International Application No. PCT/CA2013/050330, Mailed Jul. 24, 2013, 9 pages.
International Search Report and Written Opinion for International Application No. PCT/CA2013/050336, mailing date Aug. 12, 2013, 12 pages.
International Search Report and Written Opinion for International Application No. PCT/CA2015/050683; mailed Oct. 21, 2015, 7 pages.
International Search Report and Written Opinion for International Application No. PCT/CA2015/050684, mailing date Sep. 30, 2015, 9 pages.
International Search Report and Written Opinion for International Application No. PCT/IB2012/001560, Mail Date Nov. 29, 2012, 12 pages.

(56) References Cited

OTHER PUBLICATIONS

Kieba et al. "Differential Soil Impediance Obstacle Detection," U.S. Department of Energy Technical Report No. DE-FC26-02NT41318, Report Issue Date Jan. 17, 2005, 72 pages.
N. G. Cutmore et al., "Ore Characterisation and Sorting," Minerals Engineering, vol. 10, No. 4., Jan. 1997, 6 pages.
Office Action in Chile Patent Application No. 00164-2017, Mail Date Apr. 5, 2018, 12 pages.
Office Action in Chile Patent Application No. 00164-2017, Mail Date Sep. 12, 2018, 15 pages.
Partial Supplementary European Search Report for European Application No. 12803664.7, Mail Date Oct. 16, 2015, 7 pages.
Partial Supplementary European Search Report for European Application No. 13784899.0, Mail Date Feb. 16, 2016, 7 pages.
Second Examination Report for Australian Patent Application 2012277493, mailing date Sep. 27, 2016, 4 pages.
Second Examination Report for Australian Patent Application No. 2018214109, mailing date Jun. 11, 2020, 3 pages.
Second Examination Report for Australian Patent Application No. 201592228, mail date Feb. 28, 2018, 4 pages.
Second Office Action for Chilean Patent Application No. 2924-2014, mail date Jan. 7, 2017, 5 pages.
Second Office Action for Chilean Patent Application No. 2925-2014, mail date Feb. 25, 2017, 5 pages.
Second Office Action in Chilean Patent Application No. 2017-00150; mail date Feb. 13, 2019, 7 pages.
Second Office Action in Chinese Patent Application 201580050857.7; mail date Jul. 31, 2019, 8 pages.
Singh et al., "Application of image processing and radial basis neural network techniques for ore sorting and ore classification," Minerals Engineering, vol. 18, Jan. 2005, 9 pages.
Supplementary European Search Report for European Application No. 12803664.7 mailed Feb. 10, 2016, 11 pages.
Third Examination Report for Australian Patent Application 2012277493; mailed Mar. 3, 2017, 4 pages.
Third Examination Report for Australian Patent Application No. 2018214109, mailed Oct. 1, 2020, 5 pages.
Third Office Action in Chinese Patent Application 201580050857.7; mail date May 29, 2020, 4 pages.
Yang et al., "Electromagnetic conductivities of rock cores: Theory and analog results," Geophysics, vol. 62, No. 6, Nov.-Dec. 1997, 15 pages.
International Search Report and Written Opinion for International Application No. PCT/CA2023/051079, mailed Oct. 31, 2023, 8 pages.
International Search Report and Written Opinion for International Application No. PCT/CA23/51078, mailed Oct. 22, 2023, 9 pages.
Examination Report for Australian Patent Application No. 2023202061, mailed Jul. 28, 2023, 4 pages.
Examination Report for European Patent Application No. 20165382.1, mailing date Apr. 3, 2023, 6 pages.
Extended European Search Report for European Patent Application No. 23175505.9, mailed Jun. 16, 2023, 7 pages.
International Search Report and Written Opinion for International Application No. PCT/CA22/51717, mailed Mar. 14, 2023, 10 pages.
International Search Report and Written Opinion for International Application No. PCT/CA22/51718, mailed Mar. 14, 2023, 12 pages.
International Search Report and Written Opinion for International Application No. PCT/CA23/50142, mailed May 25, 2023, 6 pages.
Job et al., "Real-time shovel-mounted coal or ore sensing." Proceedings of the AusIMM Iron Ore Conference, 2017, pp. 397-406.

* cited by examiner

SELF-CLEANING SENSOR WINDOW DEVICES FOR MINE SITE EQUIPMENT AND ASSOCIATED SYSTEMS AND METHODS

CROSS-REFERENCE TO RELATED APPLICATIONS

This application claims priority to and the benefit of U.S. Provisional Patent Application No. 63/281,929, filed Nov. 22, 2021, and titled "SELF-CLEANING SENSOR WINDOW AND ASSOCIATED SYSTEMS AND METHODS," which is incorporated herein by reference in its entirety.

TECHNICAL FIELD

The present disclosure generally relates to enclosures for electronics used at the mine site and, in particular embodiments, to self-cleaning sensor windows for mine site equipment and associated methods and systems.

BACKGROUND

Sensors used at mining sites are exposed to significant amounts of dust, dirt, and other debris. The harsh mining environment can occlude transmissivity of the sensor and cause diminished performance, rendering the sensor inoperable until the sensor transmissibility has been corrected. Often, the harsh environment can cause the sensor to break, requiring full sensor replacement. Thus, sensors are typically considered of limited use at mining sites, in particular when attached to the mining equipment itself (e.g., mining shovel buckets) that are most exposed to the harsh conditions.

BRIEF DESCRIPTION OF THE DRAWINGS

Many aspects of the present disclosure can be better understood with reference to the following drawings. The components in the drawings are not necessarily to scale. Instead, emphasis is placed on clearly illustrating the principles of the present disclosure.

DETAILED DESCRIPTION

Aspects of the present disclosure are directed generally to self-cleaning sensor window devices and systems for mine site equipment, such as mining shovel buckets, and associated systems and methods. Self-cleaning sensor window devices configured in accordance with embodiments of the present technology can be stand-alone systems capable of removal from and attachment to sensor assemblies, or can be integrated into a sensor enclosure and/or the sensor itself. Various configurations of such self-cleaning sensor window devices are possible in accordance with the present technology. For example, the self-cleaning sensor window device can be positioned at a suitable location of an enclosure, with respect to one or more sensors, and/or at any suitable angle with respect to a mounting surface. Further, one configuration of the self-cleaning sensor window device may be suitable for use with more than one type or size of sensor and/or can be used for multiple sensors at once.

Specific details of several embodiments of the present technology are described herein with reference to FIGS. 1A-6. The present technology, however, can be practiced without some of these specific details. In some instances, well-known structures and techniques often associated with sensor systems and mining equipment have not been shown in detail so as not to obscure the present technology. The terminology used in the description presented below is intended to be interpreted in its broadest reasonable manner, even though it is being used in conjunction with a detailed description of certain specific embodiments of the disclosure. Certain terms can even be emphasized below; however, any terminology intended to be interpreted in any restricted manner will be overtly and specifically defined as such in this Detailed Description section.

The accompanying Figures depict embodiments of the present technology and are not intended to be limiting of its scope. The sizes of various depicted elements are not necessarily drawn to scale, and these various elements can be arbitrarily enlarged to improve legibility. Component details can be abstracted in the Figures to exclude details such as position of components and certain precise connections between such components when such details are unnecessary for a complete understanding of how to make and use the present technology. Many of the details, dimensions, angles, and other features shown in the Figures are merely illustrative of particular embodiments of the disclosure. Accordingly, other embodiments can have other details, dimensions, angles, and features without departing from the spirit or scope of the present technology.

Figure 1A:
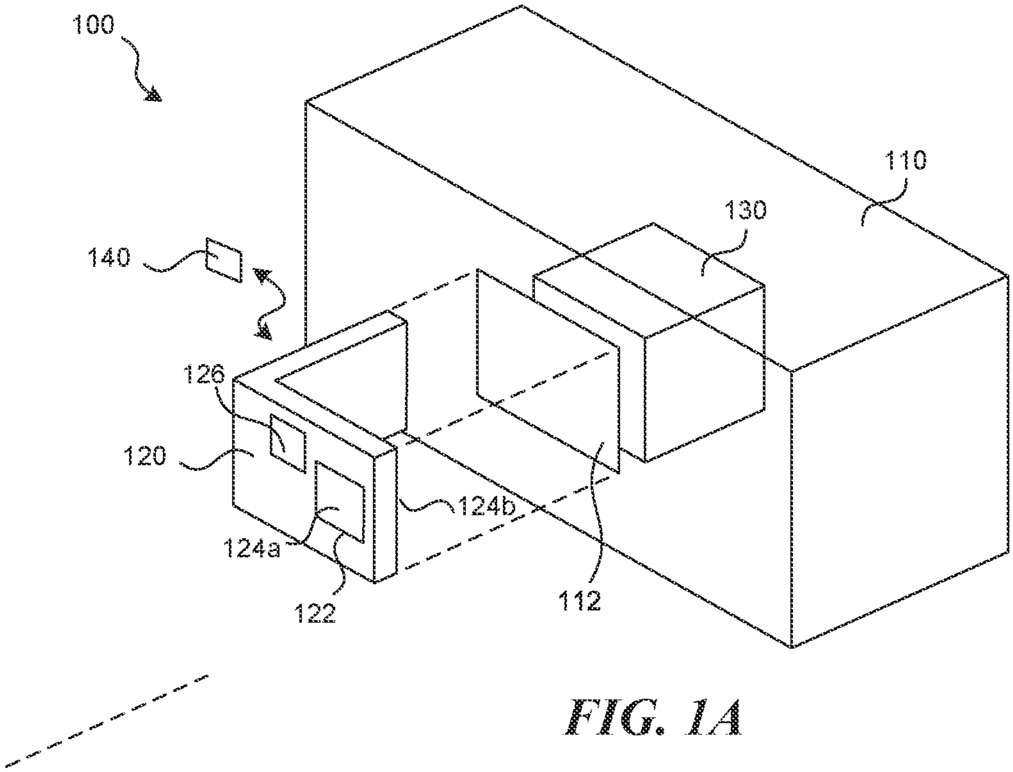
FIG. 1A is an exploded, partially transparent perspective view of a self-cleaning sensor system configured in accordance with embodiments of the present technology.
Figure 1B:
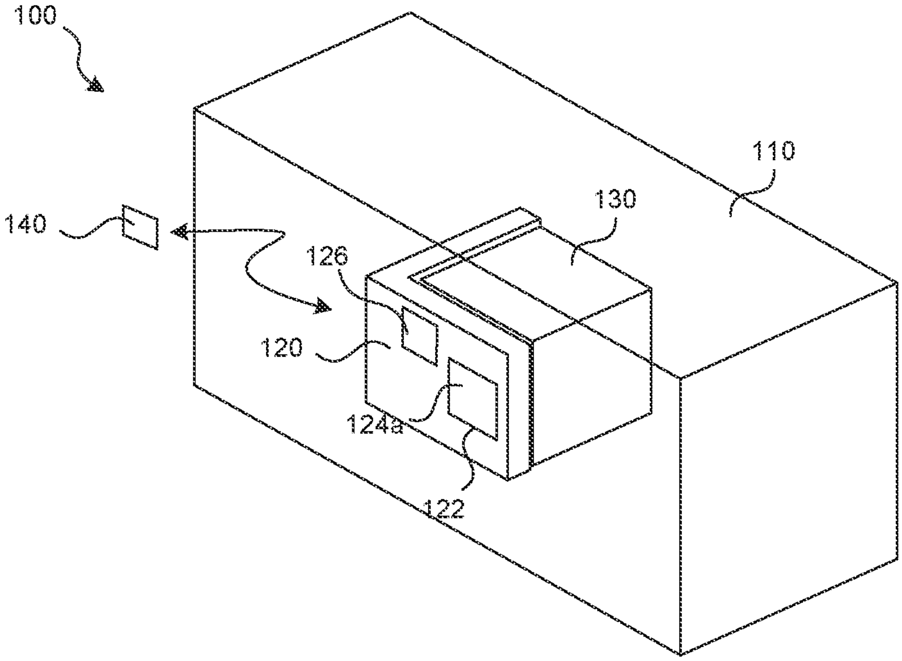
FIG. 1B is an assembled, partially transparent perspective view of the sensor enclosure assembly of FIG. 1A.

FIGS. 1A and 1B are partially schematic perspective views showing a partially exploded view and an assembled view, respectively, of a self-cleaning sensor system 100 ("system 100") configured in accordance with embodiments of the present technology. The system 100 can be any suitable shape and/or size to accommodate various mounting configurations to mining equipment and/or one or more sensors housed therein. The system 100 includes a sensor housing 110 (also referred to as a "sensor enclosure") that at least partially encases and/or carries a sensor 130. The sensor housing 110 can have an opening 112 in which a self-cleaning sensor window device 120 ("device 120") can be installed (compare FIGS. 1A and 1B). For example, the device 120 can be positioned fully or partially within the opening 112. In some embodiments, the device 120 is attached to another portion of the sensor housing 110 and/or the sensor 130 itself. In some embodiments, the self-cleaning sensor window device 120 can be integrally formed with the housing 110 itself. The self-cleaning sensor window device 120 includes a window 122 having a front surface 124*a* (also referred to as a "first surface" and an "exterior surface") facing external to the sensor housing 110 and a back surface 124*b* (also referred to as a "second surface" and an "interior surface") opposite the front surface 124*a* facing inward toward the sensor 130. The window 122 is positioned along the signal path of the sensor 130 (e.g., forward of the sensor) such that the sensor 130 can transmit and/or receive signals through the window 122 external to the sensor housing 110. The device 120 further includes a cleaning assembly 126 ("assembly 126") operably coupled to a controller 130 (also referred to as a "control unit" or a "processing unit") that causes the cleaning assembly 126 to initiate a self-cleaning function to remove debris from the front surface 124*a*, the back surface 124*b*, and/or surrounding areas of the window 122.

The sensor 130 can be one or more sensing devices, including cameras that can detect properties of mining material, distance, and/or other parameters that may be useful in a mining environment. For example, the sensor 130 may include one or more of the following: X-Ray Fluorescence (XRF) emitters, XRF detectors, laser distance sensors, ultrasonic distance sensors, lidar distance sensors, multispectral imaging cameras, flash tubes, hyperspectral imaging cameras, stereoscopic cameras, other cameras, radiation detectors, electromagnetic detectors, gamma-ray source sensors, optical sensors, and/or other sensor devices. In some embodiments, the sensor 130 can include a multispectral or hyperspectral imaging head as described in U.S. patent application Ser. No. 17/992,626, entitled COMPOSITIONAL MULTISPECTRAL AND HYPERSPECTRAL IMAGING SYSTEMS FOR MINING SHOVELS AND ASSOCIATED METHODS, filed Nov. 22, 2022, and which is incorporated by reference in its entirety.

The self-cleaning sensor window device 120 can have dimensions and/or other features that are compatible with one or more types of sensors to allow for the transmission of signals to and from the sensor 130. For example, the sensor window 122 can have dimensions based, in part, on the sensor(s) 130 with which it is associated, the features of the assembly 120, the housing 110 to which it is attached, and/or the equipment (e.g., a mining shovel bucket) with which the senor(s) 130 is/are correlated. In some embodiments, the window 122 has a minimum width of 60 mm, a minimum height of 90 mm. In some embodiments, the self-cleaning sensor window device 120 has an overall width of about 150 mm, an overall height of 150 mm or less, and a depth adjacent to the window of no more than 30 mm. The window 122 can have a specified transmittance level suitable for the sensor 130. For example, the window 122 can be made from a material having a transmittance of at least 0.5 (e.g., 0.6, 0.7, 0.8, 0.9, 1) at any wavelength within a predetermined spectral range.

In some embodiments, the window 122 can be made from a material, include a coating, and/or have a geometry that provides a predefined wavelength dispersion, acceptance angle, spectral range and/or other properties. For example, the wavelength dispersion is characterized by the V-Number, $V=(n_{center}-1)/(n_{short}-n_{long})$, where $n_{center}$, $n_{short}$, and $n_{long}$ are the refractive indices of the window at three different wavelengths, e.g., $n_{short}$ is the shortest wavelength and can be in a range from 400 nm to 450 nm, $n_{center}$ is an intermediate wavelength and can be in a range from 550 nm to 650 nm, and $n_{long}$ is the longest wavelength and can be in a range from 800 nm to 1000 nm. In some embodiments, the window 122 can be made from a material having a specified V-number and/or wedge angle between the front and back surfaces 124*a*, 124*b* suitable for the sensor 130. For example, the window 122 can have a V-number of 35 or greater, 45 or greater, and/or other suitable V-number. When the window material has a V-number greater than or equal to 45, the window 122 may also have a wedge angle less than 5 arcmin, and when the window material has a V-number between 35 and 45, the window wedge angle can be less than 1 arcmin. In other embodiments, the window 122 may be made from materials with different optical properties and/or the window can have different wedge angles and/or other dimensions.

In some embodiments, the window 122 can be made from a material and/or include a coating that has an angle of incidence between 0° and 20° of the optical surface coating for which the coating is specified, e.g., the transmission properties of the coating is specified for all angles +/−20° relative the optical axis, or surface normal, of the element to which the coating has been applied.

In various embodiments, the window 122 can include one or more permanent or removable coatings on the back surface 124*b* and/or the front surface 124*a*. For example, the back surface 124*b* can include an anti-reflective coating, such as a broadband anti-reflective coating with a spectral range having a reflectivity of less than 1.25% in the spectral range of 400 nm to 1000 nm on the surface.

The housing 110 can include one or more components made from a rigid and/or robust material (e.g., steal) that can carry the sensor 130 and the device 120, and can be mounted to any suitable mining equipment, such as mining shovel buckets of mining loading machines, e.g., wire rope shovels, hydraulic shovels, front-end loaders, and the like. The housing 110 can completely or partially enclose the sensor 130. In some embodiments, the housing 130 may be a fixture does not enclose the sensor 130, but is instead a fixture to which the sensor 130 and the device 120 can be mounted, and the fixture can then me either positioned in a separate enclosure or directly mounted to the mining equipment. Because the housing 110 is mounted to mining equipment (e.g., the mining shovel bucket that scoops the mining material at the mining site), the housing 110 and the components therein are robust so as to withstand significant shock and vibration.

Although the embodiment illustrated in FIGS. 1A and 1B includes a single sensor 130 and a single self-cleaning sensor device 120, systems arranged in accordance with the present technology can include multiple sensors positioned within the housing 110. In such multi-sensor systems, each sensor may have a dedicated self-cleaning sensor window device associated therewith, the self-cleaning sensor window device may include multiple windows corresponding to the multiple sensors, and/or more than one sensor can transmit/receive signals through a single window.

The cleaning assembly 126 can include features that increase the transmissivity of a partially or fully occluded window 122. For example, the assembly 126 may include features (e.g., wipers, blades, sponges, mechanical arms) that wipe debris from the front surface 124*a* of the window 122, one or more nozzles that spray fluid or gas to remove debris from the front surface 124*a* of the window 122, a movable film that collects and transports the debris away from the front surface of the window 122 and replaces it with new or renewed film, or any combination thereof. For example, the front surface 124*a* of the window 122 can be covered by a film that, once it collects debris, can be moved away from the front surface 124*a* by rotating spindles that remove the dirty portion of the film and positioning a clean portion of the film in front of the window 122. In some embodiments, the film can be washed away from the front surface 124*a* (e.g., via liquid or gas nozzles directed at the front surface 124*a*) and a new film can be sprayed onto the window 122.

The self-cleaning sensor window device 120 can receive electrical power from a power unit (not shown) within the housing 110 (e.g., a battery), from a power source on the mining equipment to which it is mounted (e.g., via a wired or wireless connection), and/or the self-cleaning sensor window device 120 can include an on-board power source (e.g., a battery, a solar panel). In various embodiments, the device 120 is compatible with power supplies having 24 VDC, 48 VDC, 120 VAC, and/or any other suitable power supply voltage;

The self-cleaning sensor window device 120 can be programmed to automatically clean the window 122 (or multiple windows) based on a predefined protocol and/or on command based on instructions implemented by the controller 140. The controller 140 can be configured to receive and/or transmit digital inputs and outputs for control monitoring, and/or the components of the cleaning assembly 126 itself can receive/transmit digital signals. In some embodiments, the device 120 can clean the window at user-defined time intervals. In some embodiments, the device 120 can be communicatively coupled (e.g., via a wired or wireless connection with the controller 140) to a measurement device of the mining equipment (odometer, run hour counter, etc.) to which it is mounted. In this embodiment, the device 120 can determine, via the controller 140, when a predefined threshold parameter associated with the measurement device is met (e.g., distance traveled since install or last clean, duration of mining equipment use, time since last use), and the controller 140 can send instructions to trigger a cleaning action via the assembly 126. In some embodiments, the device 120 can be configured to determine a degree of occlusion of the sensor signal (e.g., X-Ray, laser, ultrasonic, lidar, flash, etc.) and/or the transmissivity of the window 122 using information received from the sensor 130 itself, signals received from a separate sensor operably coupled to the device 120, and/or signals received from a sensor of the device 120. Based on the received information, the device 120 can clean the window at a predetermined (user- or supplier-defined) transmissivity level. In some embodiments, the sensor window device 120 may be in communication with external devices, such as portions of the mining equipment and/or user devices (e.g., smart phones, tablets, computers) via a wired or wireless connection (e.g., BLUETOOTH®, Wi-Fi, radio, etc.).

In various embodiments, the self-cleaning sensor window device can have different performance modes and forming cleaning and/or relay other information based on the mode. For example, during a startup mode, power is first applied to the device 120, and the device 120 may self-clean the window 124*a* to a base level of cleanliness (e.g., a predefined transmissivity level, a specific startup cleaning protocol). In startup mode, the device 120 can be capable of removing compacted snow or ice which is directly bonded to the viewing window 122 within a predefined time interval (e.g., 5-15 minutes, less than 5 minutes, more than 15 minutes) and/or capable of removing compacted mud which is directly bonded to the viewing window 122 within a predefined time interval (e.g., 5-15 minutes, less than 5 minutes, more than 15 minutes).

The device 120 can also be capable of providing the status of components of the device 120 (e.g., motor life and/or duty cycle, thermal readings, etc.) via the controller 140 to remote devices (e.g., smart phones, computers, tablets, mining management systems) communicatively coupled thereto via a wired or wireless connection. In some embodiments, the device itself can include indicator elements (e.g., LED lights, a screen, audible signals) that indicate the status of the device. In some embodiments, the device can provide a readiness status within a predetermined time after power on (e.g., less than 1 second, 2 seconds, 3, seconds, 4 seconds, 5 seconds, 30 seconds, 1 minute, any time therebetween).

In an operation mode, the self-cleaning sensor window device 120 is either performing a cleaning cycle, within a predefined time period from the last cleaning cycle (e.g., 5 minutes prior, 15 minutes prior, 30 minutes prior), and/or before a predefined threshold operation parameter has been met (e.g., distance since last clean, transmissivity threshold, run time of mining equipment). When the device 120 is in the operation mode, the device allows the sensor 130 to collect data through the window 122 and/or illuminate targets (e.g., via a lighting unit) external to the window 122 for optical devices. The self-cleaning window device 120 can enter a standby mode when the last cleaning cycle was performed greater than a predefined time period (e.g., 30 minutes prior, 1 hour prior).

The self-cleaning sensor window device 120 can be sufficiently ruggedized to operate cleaning cycles in the extreme conditions of a mining site, in particular when positioned on mining equipment components used directly in the mine site for removing ore (e.g., on a mining shovel bucket. For example, the device 120 can be operable coupled to and/or ruggedized electrical connectors, can operate in extreme environmental temperature ranges (e.g., −40 °C to +50 °C, at or below −40 °C, at or above +50 °C), and/or can have an altitude rating suitable for the applicable mining environment. Further, the device 120 can operate during vibration of a predetermined frequency (e.g., 10,000 Hz to 30,000 Hz) for a predetermined time interval (e.g., 2 minutes, 5 minutes, 10 minutes, 30 minutes). In some embodiments, the device 120 can perform functional requirements during a random vibration of 20 Hz to 2,000 Hz.

In use, the device 120 can be installed on the buckets of mining loading machines, such as wire rope shoves, hydraulic shovels and front-end loaders, withstand the extreme operating environment (e.g., extreme dirt and dust), and undergo significant shock and vibration, all while automatically cleaning a viewing window so that sensors used in such environments can continue to be used without human intervention. That is, when dirt and dust built up on the sensor window 122, it can cause the sensor to suffer a loss in performance or render it inoperable. However, the device 120 can clean itself when this occurs to provide a clean viewing window 122 for the sensor 130 without the need for manual cleaning or replacement. This is especially useful as the sensors used on mine site equipment are positioned in locations that are difficult to reach for service and it avoids delays in cleaning that reduce the performance of the sensors.

Figure 2:
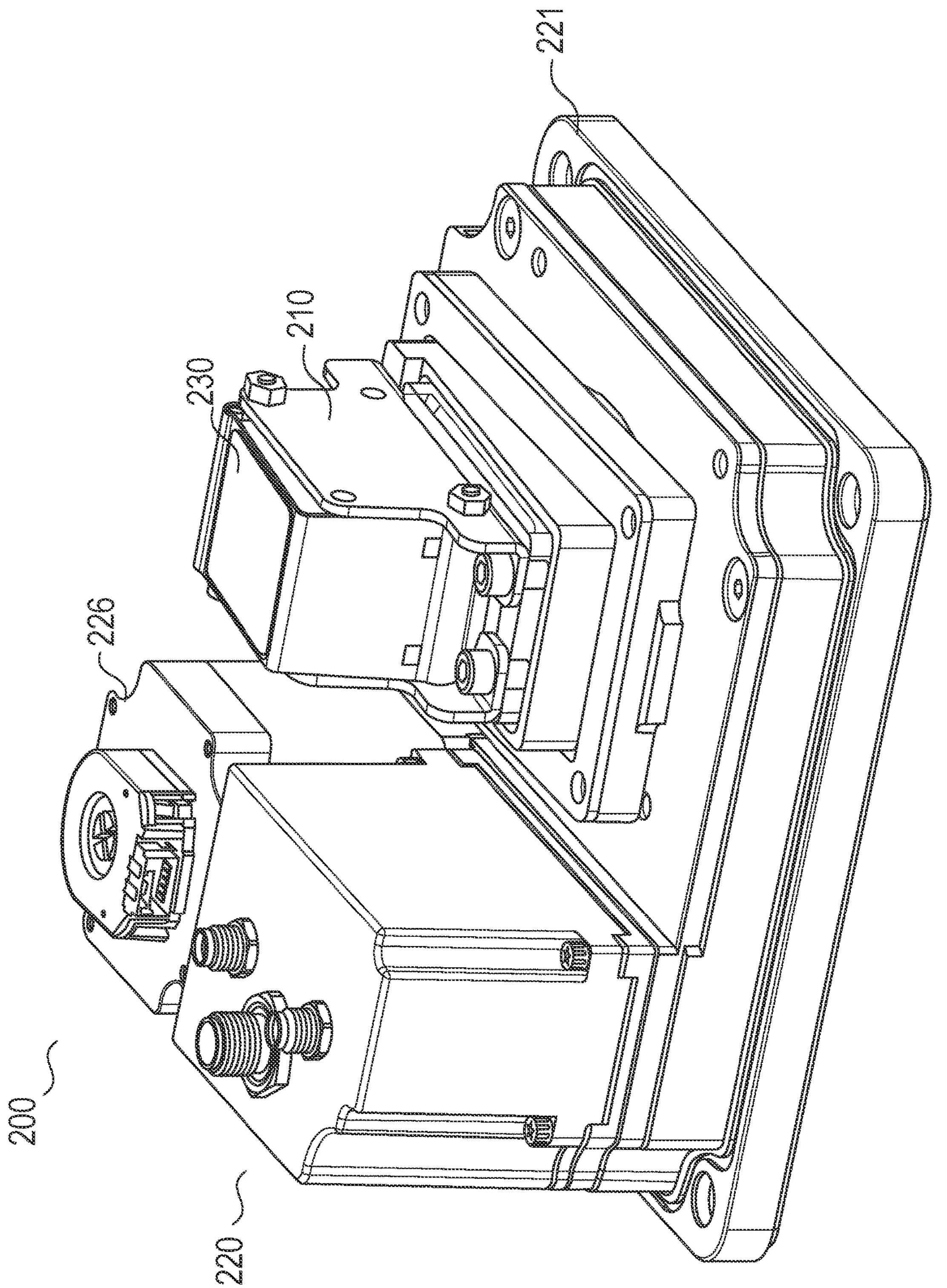
FIG. 2 is an isometric view of a self-cleaning sensor window system configured in accordance with embodiments of the present technology.

FIG. 2 is an isometric view of a self-cleaning sensor window system 200 ("system 200") configured in accordance with embodiments of the present technology. The system 200 includes several features generally similar to the system 100 described above with respect to FIGS. 1A and 1B. For example, the system 200 includes a housing 210 carrying a sensor 230 and a self-cleaning sensor window device 220 ("device 220"). The device 220 includes a body 221 that couples to the housing 210 and/or the sensor 230 itself, and carries a sensor window (not shown, the sensor 230 being positioned thereon) and a cleaning assembly 226. The cleaning assembly 226 can include or be operably coupled t a controller (not shown) that is configured to provide instructions for automatically performing a cleaning cycle to remove dirt and debris from the window as described above with respect to FIGS. 1A and 1B. In the illustrated embodiment, the sensor 230 is a distance measuring device (e.g., a laser distance measuring device), though other sensors can be used in conjunction with the device 220.

Figure 3:
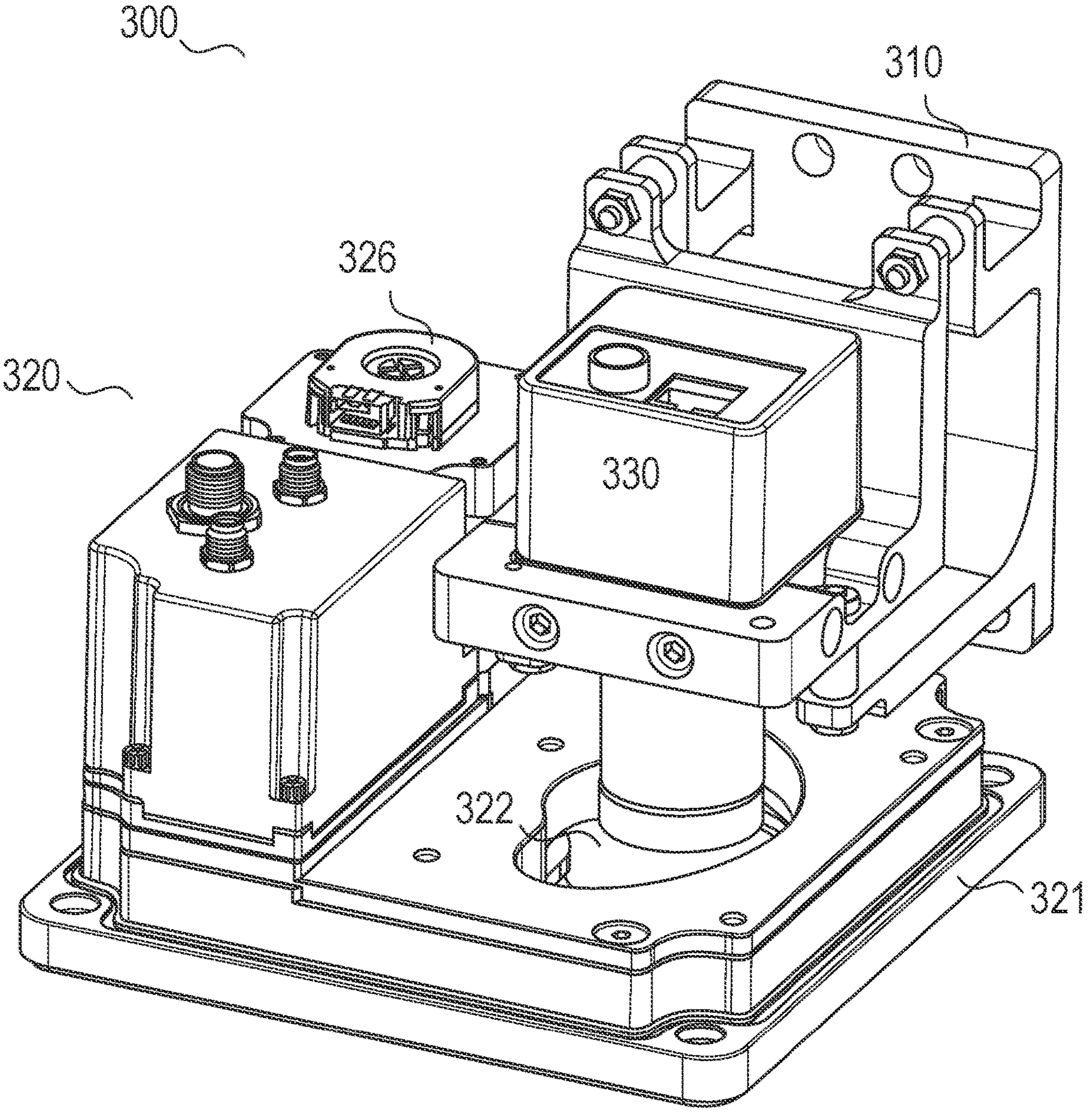
FIG. 3 is an isometric view of a self-cleaning sensor window system configured in accordance with embodiments of the present technology.

FIG. 3 is an isometric view of a self-cleaning sensor window system 300 ("system 300") configured in accordance with embodiments of the present technology. The system 300 includes several features generally similar to the systems 100 and 200 described above with respect to FIGS. 1A-2. For example, the system 300 includes a housing 310 carrying a sensor 330 and a self-cleaning sensor window device 320 ("device 320"). The device 320 includes a body 321 that couples to the housing 310 and/or the sensor 330 itself, and carries a sensor window 322 and a cleaning assembly 326. The cleaning assembly 326 can include or be operably coupled t a controller (not shown) that is configured to provide instructions for automatically performing a cleaning cycle to remove dirt and debris from the window as described above with respect to FIGS. 1A and 1B. In the illustrated embodiment, the sensor 330 is a multispectral imaging ("MSI") camera, though other sensors can be used in conjunction with the device 320.

As shown in FIGS. 2 and 3, the housings 210, 310 are fixtures, rather than complete enclosures, and can be mounted to a portion of mine site equipment, such as at or near an inlet of a mining shovel bucket, within the cheek of a mining shovel bucket (e.g., for in-cheek sensing). The system 200, 300 can also be positioned within an opening of a separate enclosure that partially or fully surrounds the device 210, 310 and the sensor 230, 330.

Figure 4:
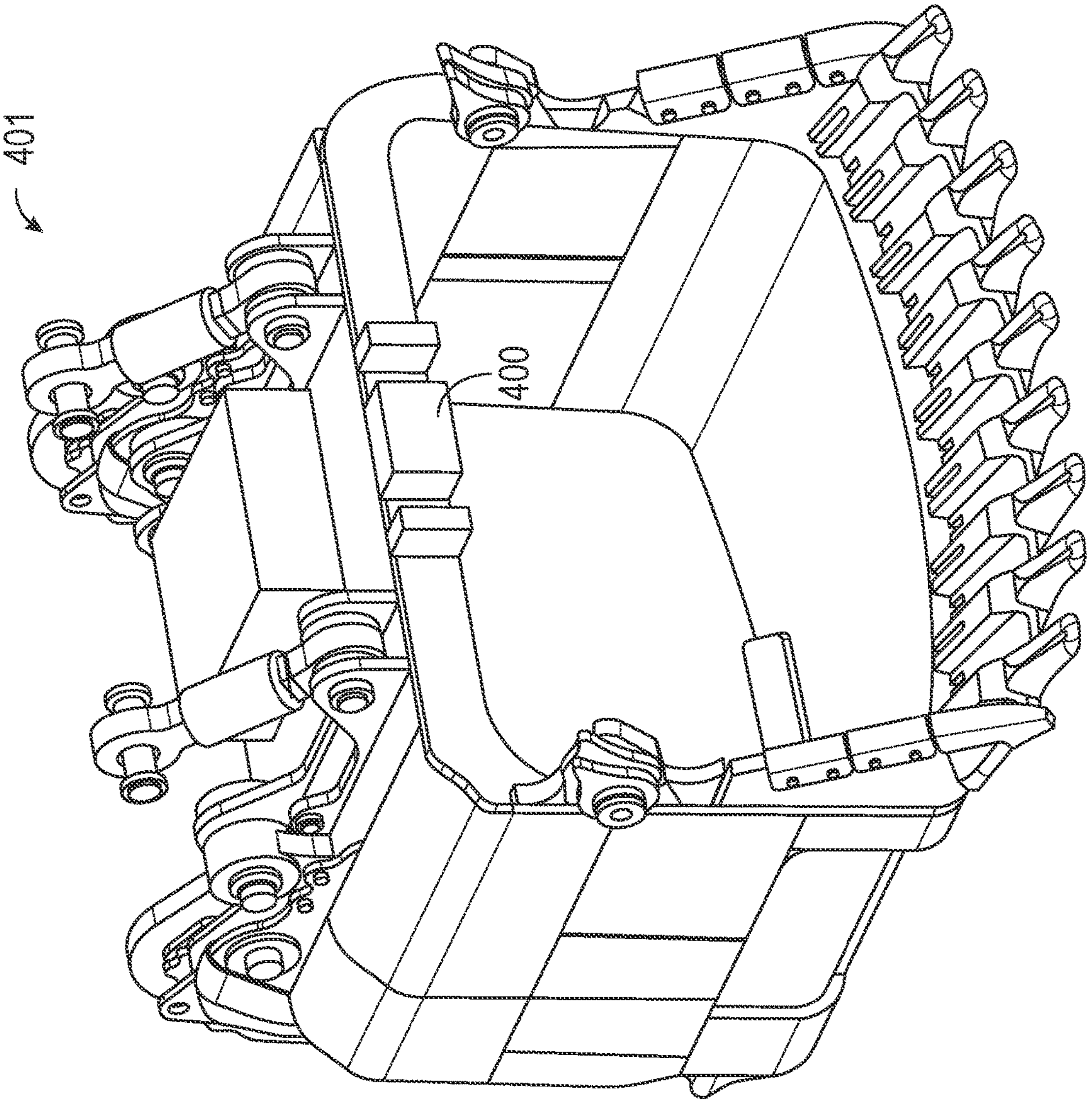
FIG. 4 is an isometric view of a self-cleaning sensor window system positioned on a mining shovel bucket in accordance with embodiments of the present technology.

FIG. 4 is an isometric view of a self-cleaning sensor window system 400 ("system 400") positioned on a mining shovel bucket 401 in accordance with embodiments of the present technology. The system 400 can include any of the features of the systems 100, 200, 300 described above with respect to FIGS. 1A-3. As shown in FIG. 4, the system 400 can be positioned at an upper portion of a mining shovel bucket near the inlet to detect properties of materials and/or other parameters associated with material entering or in the mining shovel bucket. The system 400 can be positioned within the bucket itself (e.g., along the side walls, at the bottom) and/or along other portions associated with the mining shovel bucket.

Figure 5:
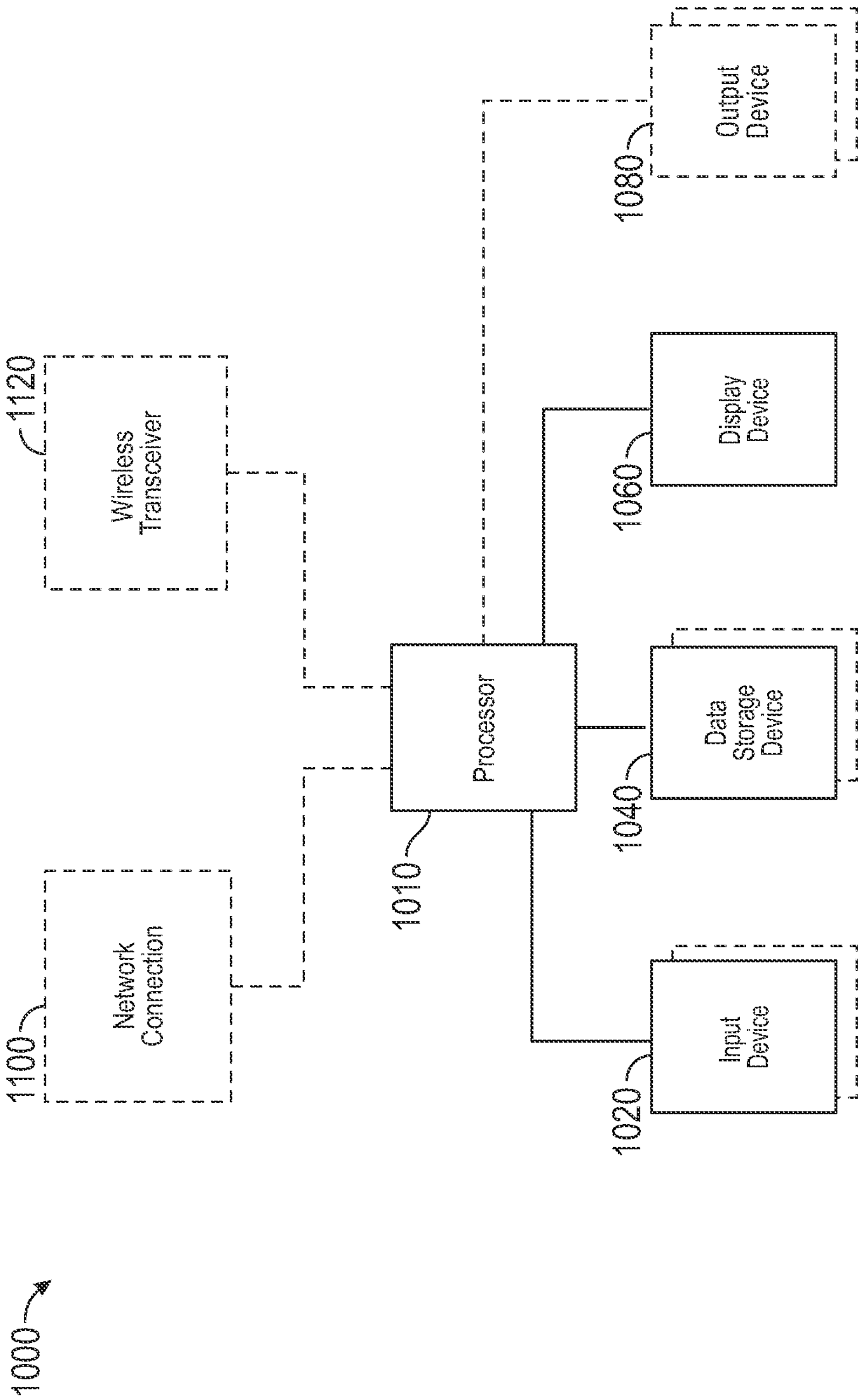
FIG. 5 is a block diagram of a suitable computer that may employ aspects of the various embodiments of the present technology.
Figure 6:
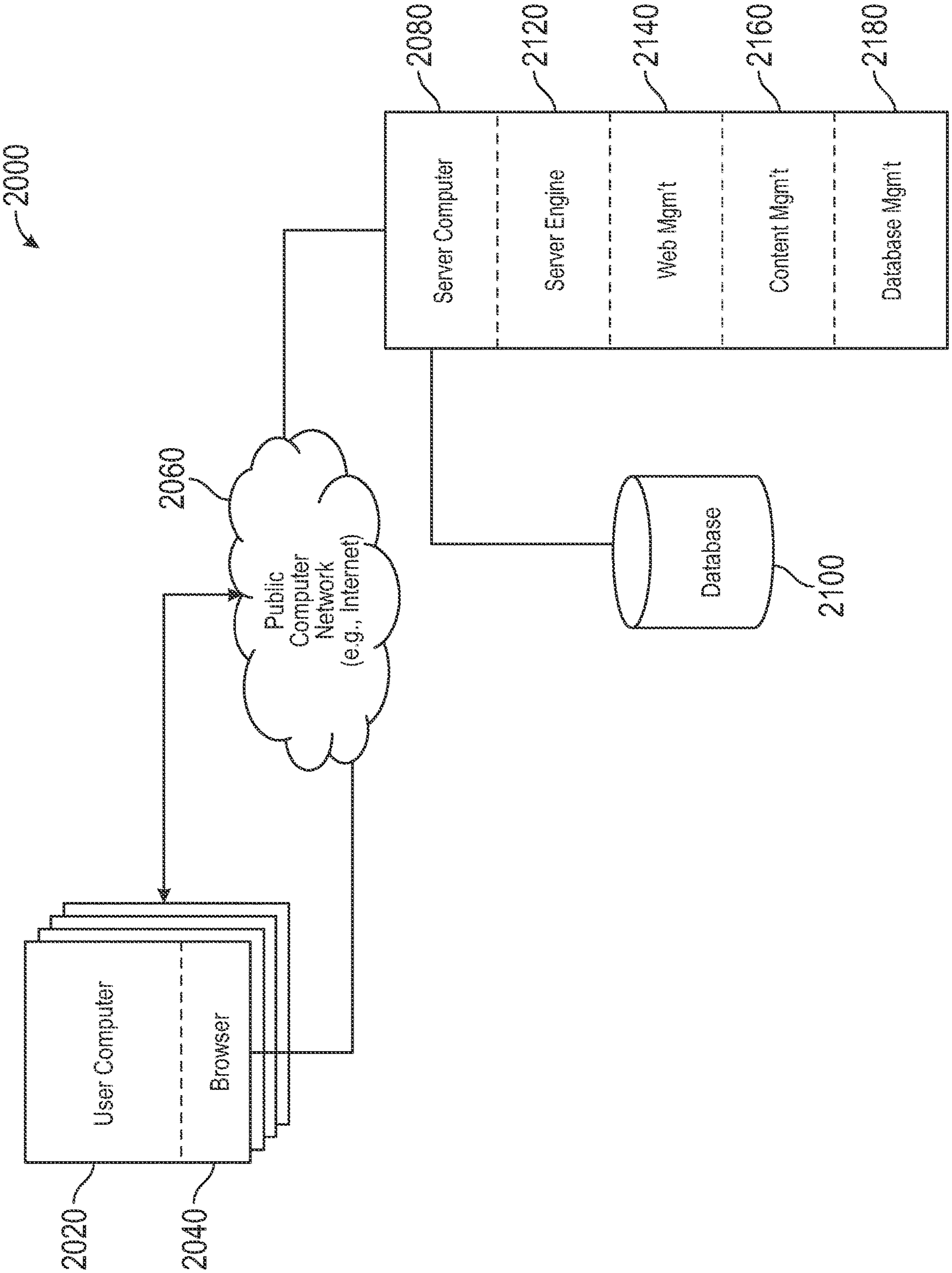
FIG. 6 is a block diagram illustrating a suitable system in which aspects of the various embodiments described herein may operate in a networked computer environment.

FIG. 5 and the following discussion provide a brief, general description of a suitable computing environment in which aspects of the disclosed system can be implemented. Although not required, aspects and embodiments of the disclosed system will be described in the general context of computer-executable instructions, such as routines executed by a general-purpose computer, e.g., a server or personal computer. Those skilled in the relevant art will appreciate that the various embodiments can be practiced with other computer system configurations, including Internet appliances, hand-held devices, wearable computers, cellular or mobile phones, multi-processor systems, microprocessor-based or programmable consumer electronics, set-top boxes, network PCs, mini-computers, mainframe computers and the like. The embodiments described herein can be embodied in a special purpose computer or data processor that is specifically programmed, configured or constructed to perform one or more of the computer-executable instructions explained in detail below. Indeed, the term "computer" (and like terms), as used generally herein, refers to any of the above devices, as well as any data processor or any device capable of communicating with a network, including consumer electronic goods such as game devices, cameras, or other electronic devices having a processor and other components, e.g., network communication circuitry.

The embodiments described herein can also be practiced in distributed computing environments, where tasks or modules are performed by remote processing devices, which are linked through a communications network, such as a Local Area Network ("LAN"), Wide Area Network ("WAN") or the Internet. In a distributed computing environment, program modules or sub-routines may be located in both local and remote memory storage devices. Aspects of the system described below may be stored or distributed on computer-readable media, including magnetic and optically readable and removable computer discs, stored as in chips (e.g., EEPROM or flash memory chips). Alternatively, aspects of the system disclosed herein may be distributed electronically over the Internet or over other networks (including wireless networks). Those skilled in the relevant art will recognize that portions of the embodiments described herein may reside on a server computer, while corresponding portions reside on a client computer. Data structures and transmission of data particular to aspects of the system described herein are also encompassed within the scope of this application.

Referring to FIG. 5, one embodiment of the system described herein employs a computer 1000, such as a personal computer or workstation, having one or more processors 1010 coupled to one or more user input devices 1020 and data storage devices 1040. The computer is also coupled to at least one output device such as a display device 1060 and one or more optional additional output devices 1080 (e.g., printer, plotter, speakers, tactile or olfactory output devices, etc.). The computer may be coupled to external computers, such as via an optional network connection 1100, a wireless transceiver 1120, or both.

The input devices 1020 may include a keyboard and/or a pointing device such as a mouse. Other input devices are possible such as a microphone, joystick, pen, game pad, scanner, digital camera, video camera, and the like. The data storage devices 1040 may include any type of computer-readable media that can store data accessible by the computer 1000, such as magnetic hard and floppy disk drives, optical disk drives, magnetic cassettes, tape drives, flash memory cards, digital video disks (DVDs), Bernoulli cartridges, RAMs, ROMs, smart cards, etc. Indeed, any medium for storing or transmitting computer-readable instructions and data may be employed, including a connection port to or node on a network such as a local area network (LAN), wide area network (WAN) or the Internet (not shown in FIG. 5).

Aspects of the system described herein may be practiced in a variety of other computing environments. For example, referring to FIG. 6, a distributed computing environment with a web interface includes one or more user computers 2020 in a system 2000 are shown, each of which includes a browser program module 2040 that permits the computer to access and exchange data with the Internet 2060, including web sites within the World Wide Web portion of the Internet. The user computers may be substantially similar to the computer described above with respect to FIG. 6. User computers may include other program modules such as an operating system, one or more application programs (e.g., word processing or spread sheet applications), and the like. The computers may be general-purpose devices that can be programmed to run various types of applications, or they may be single-purpose devices optimized or limited to a particular function or class of functions. More importantly, while shown with web browsers, any application program for providing a graphical user interface to users may be employed, as described in detail below; the use of a web browser and web interface are only used as a familiar example.

At least one server computer 2080, coupled to the Internet or World Wide Web ("Web") 2060, performs much or all of the functions for receiving, routing and storing of electronic messages, such as web pages, audio signals, and electronic images. While the Internet is shown, a private network, such as an intranet may indeed be preferred in some applications. The network may have a client-server architecture, in which a computer is dedicated to serving other client computers, or it may have other architectures such as a peer-to-peer, in which one or more computers serve simultaneously as servers and clients. A database 2100 or databases, coupled to the server computer(s), stores much of the web pages and content exchanged between the user computers. The server computer(s), including the database(s), may employ security measures to inhibit malicious attacks on the system, and to preserve integrity of the messages and data stored therein (e.g., firewall systems, secure socket layers (SSL), password protection schemes, encryption, and the like).

The server computer 2080 may include a server engine 2120, a web page management component 2140, a content management component 2160 and a database management component 2180. The server engine performs basic processing and operating system level tasks. The web page management component handles creation and display or routing of web pages. Users may access the server computer by means of a URL associated therewith. The content management component handles most of the functions in the embodiments described herein. The database management component includes storage and retrieval tasks with respect to the database, queries to the database, and storage of data.

Further Examples

The following examples are illustrative of several embodiments of the present technology:

1. A self-cleaning sensor system for use on mine site equipment, the self-cleaning sensor system comprising:
   - a sensor enclosure having an opening;
   - a sensor carried by the sensor enclosure; and
   - a self-cleaning window device coupled to the sensor enclosure and positioned at least partially within the opening, wherein the self-cleaning window device comprises—
     - a window having a front surface facing external to the sensor enclosure and a back surface facing internal to the sensor enclosure, wherein the window is positioned forward of the sensor to allow the sensor to transmit and/or receive signals through the window; and
     - a cleaning assembly directed toward the window and configured to clean debris from the front surface of the window; and
     - a controller operably coupled to the cleaning assembly, wherein the controller is configured to transmit control signals to the cleaning assembly to initiate cleaning of the front surface.

2. The self-cleaning sensor system of any one of the examples herein wherein the self-cleaning window device is removably attached to the sensor enclosure.

3. The self-cleaning sensor system of any one of the examples herein wherein the self-cleaning window device is integrally formed with the sensor enclosure.

4. The self-cleaning sensor system of any one of the examples herein wherein the cleaning assembly comprises a wiper configured to wipe debris from the front surface of the window.

5. The self-cleaning sensor system of any one of the examples herein wherein the cleaning assembly comprises a nozzle configured to spray fluid to remove debris from the front surface of the window.

6. The self-cleaning sensor system of any one of the examples herein wherein the cleaning assembly comprises a movable film positioned along the front surface of the window, wherein the movable film is configured to collect and transport debris away from a front surface of the window.

7. The self-cleaning sensor system of any one of the examples herein wherein the controller is configured to activate the cleaning assembly at predetermined time intervals.

8. The self-cleaning sensor system of any one of the examples herein wherein the cleaning assembly is operably coupled to a mining equipment device on a mining shovel bucket, and wherein the cleaning assembly is configured to clean the window when a parameter measured by the mining equipment device reaches a parameter threshold.

9. The self-cleaning sensor system of example 8 wherein the mining equipment device comprises an odometer.

10. The self-cleaning sensor system of any one of the examples herein wherein the window has a V-number of at least 35, a wedge angle less than 5 arcmin, and a transmittance of at least 0.5.

11. The self-cleaning sensor system of any one of the examples herein wherein the window comprises a broadband anti-reflection coating on the back surface, and wherein the broadband anti-reflection coating has a reflectivity less than 1.25% in a spectral range between 400 nm and 1000 nm.

12. The self-cleaning sensor system of any one of the examples herein wherein the self-cleaning window device is configured to operate at a vibration frequency between of 30 kHz for 30 minutes.

13. The self-cleaning sensor system of any one of the examples herein wherein the sensor is a multi-spectral imaging camera.

14. The self-cleaning sensor system of any one of the examples herein wherein the sensor is a proximity sensor.

15. A self-cleaning sensor window device, comprising:
   - a housing configured to be coupled to a sensor enclosure of a mining shovel bucket;
   - a window coupled to the housing, the window having an exterior surface and an interior surface, wherein the window is configured to be positioned along a signal path of a sensor to allow the sensor to transmit and/or receive signals therethrough;
   - a cleaning assembly carried by the housing, wherein the cleaning assembly configured to clean debris from the exterior surface of the window; and
   - a controller operably coupled to the cleaning assembly, wherein the controller is configured to transmit control signals to the cleaning assembly to initiate cleaning of the exterior surface.

16. The self-cleaning sensor window device of any one of the examples herein wherein the controller is configured to compare a transmissivity level of the window to a transmissivity threshold value, and wherein the controller is configured to send instructions to cause the cleaning assembly to clean the exterior surface of the window when the transmissivity level of the window is above the transmissivity threshold value.

17. The self-cleaning sensor window device of any one of the examples herein wherein the controller is configured to second instructions to cause the cleaning assembly to enter a startup mode in which the cleaning assembly is configured to clean the exterior surface of the window to a predefined base cleanliness level, and wherein the startup mode lasts less than 15 minutes.

18. The self-cleaning sensor window device of any one of the examples herein wherein the controller is configured to receive signals related to window cleanliness, and wherein the controller is configured to send instructions to indicate to a user a readiness status of the self-cleaning sensor window device based on the window cleanliness within one minute of powering on.

19. The self-cleaning sensor window device of any one of the examples herein wherein the window comprises a broadband anti-reflection coating on the interior surface, and wherein the broadband anti-reflection coating has a reflectivity less than 1.25% in a spectral range between 400 nm and 1000 nm.

20. The self-cleaning sensor window device of any one of the examples herein wherein the cleaning assembly comprises a light configured to illuminate a region proximate to the exterior surface of the window.

21. The self-cleaning sensor window device of any one of the examples herein wherein the cleaning assembly is configured to operate at a temperature of −40 degrees Celsius.

22. The self-cleaning sensor window device of any one of the examples herein wherein the cleaning assembly is configured to operate at a temperature of 50 degrees Celsius.

23. The self-cleaning sensor window device of any one of the examples herein wherein the cleaning assembly is configured to operate when at a vibration frequency between 10 kHz and 30 kHz for a predetermined time interval of at least 2 minutes.

24. A method of operating a self-cleaning window device positioned on a mining shovel bucket, the method comprising:

- in response to at least one control signal provided by at least one or more controllers:
  - causing a cleaning assembly to clean a front surface of a window to a base cleanliness level during a startup mode, wherein the window is positioned to allow a sensor positioned behind a back surface of the window to receive signals through the window;
  - in response to receiving a parameter value above a predetermined threshold value, causing the cleaning assembly to clean the front surface of the window.

25. The method of claim 24, further comprising:

- determining, via the one or more controllers, a transmissivity level of the window using signals received from the sensor, and
- wherein the parameter value is the transmissivity level and the predetermined threshold value is a predetermined transmissivity value.

26. The method of claim 24, further comprising causing the cleaning assembly to illuminate a region proximate to the front surface of the window.

27 The method of claim 24, further comprising operating the cleaning assembly at a vibration frequency between 10 kHz and 30 kHz.

28. The method of claim 24 wherein the sensor is a multispectral imaging camera, and wherein the method further comprises imaging a region positioned beyond the front surface of the window with the multispectral imaging camera.

29. The method of claim 24 wherein the sensor is a proximity sensor, and wherein the method further comprises detecting proximity of mining material beyond the front surface of the window with the proximity sensor.

30 The method of claim 24, further comprising:

- mounting the self-cleaning window device on the mining shovel bucket; and
- detecting, via the sensor, parameters associated with mining material entering and/or positioned within the mining shovel bucket.

Conclusion

In general, the detailed description of embodiments of the present technology is not intended to be exhaustive or to limit the invention to the precise form disclosed above. While specific embodiments of, and examples for, the present technology are described above for illustrative purposes, various equivalent modifications are possible within the scope of the present technology, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

Aspects of the present technology may be stored or distributed on computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present technology may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the present technology reside on a server computer, while corresponding portions reside on a client computer such as a mobile or portable device, and thus, while certain hardware platforms are described herein, aspects of the present technology are equally applicable to nodes on a network.

The teachings of the present technology provided herein can be applied to other systems, not necessarily the system described herein. The elements and acts of the various embodiments described herein can be combined to provide further embodiments.

Any patents, applications and other references, including any that may be listed in accompanying filing papers, are incorporated herein by reference. Aspects of the present technology can be modified, if necessary, to employ the systems, functions, and concepts of the various references described above to provide yet further embodiments of the present technology.

These and other changes can be made to the present technology in light of the above Detailed Description. While the above description details certain embodiments of the present technology and describes the best mode contemplated, no matter how detailed the above appears in text, the present technology can be practiced in many ways. Details of the present technology may vary considerably in its implementation details, while still being encompassed by the present technology disclosed herein. As noted above, particular terminology used when describing certain features or aspects of the present technology should not be taken to imply that the terminology is being redefined herein to be restricted to any specific characteristics, features, or aspects of the present technology with which that terminology is associated. In general, the terms used in the following claims should not be construed to limit the present technology to the specific embodiments disclosed in the specification, unless the above Detailed Description section explicitly defines such terms. Accordingly, the actual scope of the invention encompasses not only the disclosed embodiments, but also all equivalent ways of practicing or implementing the present technology.

We claim:

1. An apparatus, comprising:

a mine site equipment; and a self-cleaning sensor system operatively coupled to the mine site equipment, the self-cleaning sensor system comprising:

a sensor enclosure having an opening;

a sensor carried by the sensor enclosure; and a self-cleaning window device coupled to the sensor enclosure and positioned at least partially within the opening, wherein the self-cleaning window device comprises— a window having a front surface facing external to the sensor enclosure and a back surface facing internal to the sensor enclosure, wherein the window is positioned forward of the sensor to allow the sensor to transmit and/or receive signals through the window; and a cleaning assembly directed toward the window and configured to clean debris from the front surface of the window, the cleaning assembly is operably coupled to a mining shovel bucket of the mine site equipment; and a controller operably coupled to the cleaning assembly, wherein the controller is configured to transmit control signals to the cleaning assembly to initiate cleaning of the front surface, wherein the cleaning assembly is configured to clean the window when a parameter measured by the mining equipment reaches a predetermined threshold.

2. An apparatus, comprising:

a mine site equipment;

a self-cleaning sensor system for use on the mine site equipment, the self-cleaning sensor system comprising:

a sensor enclosure having an opening;

a sensor carried by the sensor enclosure; and a self-cleaning window device coupled to the sensor enclosure and positioned at least partially within the opening, wherein the self-cleaning window device comprises— a window having a front surface facing external to the sensor enclosure and a back surface facing internal to the sensor enclosure, wherein the window is positioned forward of the sensor to allow the sensor to transmit and/or receive signals through the window; and a cleaning assembly directed toward the window and configured to clean debris from the front surface of the window, the cleaning assembly is operably coupled to a mining shovel bucket of the mine site equipment; and a controller operably coupled to the cleaning assembly, wherein the controller is configured to transmit control signals to the cleaning assembly to initiate cleaning of the front surface;

wherein the mining equipment device comprises an odometer.

3. The apparatus of claim 2 wherein the self-cleaning window device is removably attached to the sensor enclosure.

4. The apparatus of claim 2 wherein the self-cleaning window device is integrally formed with the sensor enclosure.

5. The apparatus of claim 2 wherein the cleaning assembly comprises a wiper configured to wipe debris from the front surface of the window.

6. The apparatus of claim 5 wherein the cleaning assembly comprises a nozzle configured to spray fluid to remove debris from the front surface of the window.

7. The apparatus of claim 2 wherein the cleaning assembly comprises a movable film positioned along the front surface of the window, wherein the movable film is configured to collect and transport debris away from a front surface of the window.

8. The apparatus of claim 2 wherein the controller is configured to activate the cleaning assembly at predetermined time intervals.

9. The apparatus of claim 2 wherein the window has a V-number of at least 35, a wedge angle less than 5 arcmin, and a transmittance of at least 0.5.

10. The apparatus of claim 2 wherein the window comprises a broadband anti-reflection coating on the back surface, and wherein the broadband anti-reflection coating has a reflectivity less than 1.25% in a spectral range between 400 nm and 1000 nm.

11. An apparatus, comprising:

a mine site equipment; and a self-cleaning sensor system for use on mine site equipment, the self-cleaning sensor system comprising:

a sensor enclosure having an opening;

a sensor carried by the sensor enclosure; and a self-cleaning window device coupled to the sensor enclosure and positioned at least partially within the opening, wherein the self-cleaning window device comprises, wherein the self-cleaning window device is configured to operate at a vibration frequency between of 30 kHz for 30 minutes;

a window having a front surface facing external to the sensor enclosure and a back surface facing internal to the sensor enclosure, wherein the window is positioned forward of the sensor to allow the sensor to transmit and/or receive signals through the window; and a cleaning assembly directed toward the window and configured to clean debris from the front surface of the window; and a controller operably coupled to the cleaning assembly, wherein the controller is configured to transmit control signals to the cleaning assembly to initiate cleaning of the front surface.

12. The apparatus of claim 2 wherein the sensor is a multi-spectral 1 magmg camera.

13. The apparatus of claim 2 wherein the sensor is a proximity sensor.

14. A self-cleaning sensor window device, comprising:

a housing configured to be coupled to a sensor enclosure of a mining shovel bucket;

a window coupled to the housing, the window having an exterior surface and an interior surface, wherein the window is configured to be positioned along a signal path of a sensor to allow the sensor to transmit and/or receive signals therethrough;

a cleaning assembly carried by the housing, wherein the cleaning assembly configured to clean debris from the exterior surface of the window; and a controller operably coupled to the cleaning assembly, wherein the controller is configured to transmit control signals to the cleaning assembly to initiate cleaning of the exterior surface;

wherein the controller is configured to compare a transmissivity level of the window to a transmissivity threshold value, and wherein the controller is configured to send instructions to cause the cleaning assembly to clean the exterior surface of the window when the transmissivity level of the window is above the transmissivity threshold value.

15. A self-cleaning sensor window device, comprising:

a housing configured to be coupled to a sensor enclosure of a mining shovel bucket;

a window coupled to the housing, the window having an exterior surface and an interior surface, wherein the window is configured to be positioned along a signal path of a sensor to allow the sensor to transmit and/or receive signals therethrough;

a cleaning assembly carried by the housing, wherein the cleaning assembly configured to clean debris from the exterior surface of the window; and a controller operably coupled to the cleaning assembly, wherein the controller is configured to transmit control signals to the cleaning assembly to initiate cleaning of the exterior surface;

wherein the controller is configured to second instructions to cause the cleaning assembly to enter a startup mode in which the cleaning assembly is configured to clean the exterior surface of the window to a predefined base cleanliness level, and wherein the startup mode lasts less than 15 minutes.

16. A self-cleaning sensor window device, comprising:

a housing configured to be coupled to a sensor enclosure of a mining shovel bucket;

a window coupled to the housing, the window having an exterior surface and an interior surface, wherein the window is configured to be positioned along a signal path of a sensor to allow the sensor to transmit and/or receive signals therethrough;

a cleaning assembly carried by the housing, wherein the cleaning assembly configured to clean debris from the exterior surface of the window; and a controller operably coupled to the cleaning assembly, wherein the controller is configured to transmit control signals to the cleaning assembly to initiate cleaning of the exterior surface;

wherein the controller is configured to receive signals related to window cleanliness, and wherein the controller is configured to send instructions to indicate to a user a readiness status of the self-cleaning sensor window device based on the window cleanliness within one minute of powering on.

17. A self-cleaning sensor window device, comprising:

a housing configured to be coupled to a sensor enclosure of a mining shovel bucket;

a window coupled to the housing, the window having an exterior surface and an interior surface, wherein the window is configured to be positioned along a signal path of a sensor to allow the sensor to transmit and/or receive signals therethrough, wherein the window comprises a broadband anti-reflection coating on the interior surface, and wherein the broadband anti-reflection coating has a reflectivity less than 1.25% in a spectral range between 400 nm and 1000 nm;

a cleaning assembly carried by the housing, wherein the cleaning assembly configured to clean debris from the exterior surface of the window; and a controller operably coupled to the cleaning assembly, wherein the controller is configured to transmit control signals to the cleaning assembly to initiate cleaning of the exterior surface.

18. A self-cleaning sensor window device, comprising:

a housing configured to be coupled to a sensor enclosure of a mining shovel bucket;

a window coupled to the housing, the window having an exterior surface and an interior surface, wherein the window is configured to be positioned along a signal path of a sensor to allow the sensor to transmit and/or receive signals therethrough;

a cleaning assembly carried by the housing, wherein the cleaning assembly configured to clean debris from the exterior surface of the window; wherein the cleaning assembly comprises a light configured to illuminate a region proximate to the exterior surface of the window and a controller operably coupled to the cleaning assembly, wherein the controller is configured to transmit control signals to the cleaning assembly to initiate cleaning of the exterior surface.

19. A self-cleaning sensor window device, comprising:

a housing configured to be coupled to a sensor enclosure of a mining shovel bucket;

a window coupled to the housing, the window having an exterior surface and an interior surface, wherein the window is configured to be positioned along a signal path of a sensor to allow the sensor to transmit and/or receive signals therethrough;

a cleaning assembly carried by the housing, wherein the cleaning assembly configured to clean debris from the exterior surface of the window, wherein the cleaning assembly is configured to operate at a temperature of −40 degrees Celsius; and a controller operably coupled to the cleaning assembly, wherein the controller is configured to transmit control signals to the cleaning assembly to initiate cleaning of the exterior surface.

20. A self-cleaning sensor window device, comprising:

a housing configured to be coupled to a sensor enclosure of a mining shovel bucket;

a window coupled to the housing, the window having an exterior surface and an interior surface, wherein the window is configured to be positioned along a signal path of a sensor to allow the sensor to transmit and/or receive signals therethrough;

a cleaning assembly carried by the housing, wherein the cleaning assembly configured to clean debris from the exterior surface of the window, wherein the cleaning assembly is configured to operate at a temperature of 50 degrees Celsius; and a controller operably coupled to the cleaning assembly, wherein the controller is configured to transmit control signals to the cleaning assembly to initiate cleaning of the exterior surface.

21. A self-cleaning sensor window device, comprising:

a housing configured to be coupled to a sensor enclosure of a mining shovel bucket;

a window coupled to the housing, the window having an exterior surface and an interior surface, wherein the window is configured to be positioned along a signal path of a sensor to allow the sensor to transmit and/or receive signals therethrough;

a cleaning assembly carried by the housing, wherein the cleaning assembly configured to clean debris from the exterior surface of the window, wherein the cleaning assembly is configured to operate when at a vibration frequency between 10 kHz and 30 kHz for a predetermined time interval of at least 2 minutes; and a controller operably coupled to the cleaning assembly, wherein the controller is configured to transmit control signals to the cleaning assembly to initiate cleaning of the exterior surface.

22. A method of operating a self-cleaning window device positioned on a mining shovel bucket, the method comprising:

in response to at least one control signal provided by at least one or more controllers:

causing a cleaning assembly to clean a front surface of a window to a base cleanliness level during a startup mode, wherein the window is positioned to allow a sensor positioned behind a back surface of the window to receive signals through the window;

in response to receiving a parameter value above a predetermined threshold value, causing the cleaning assembly to clean the front surface of the window.

23. The method of claim 22, further comprising:

determining, via the one or more controllers, a transmissivity level of the window using signals received from the sensor, and wherein the parameter value is the transmissivity level and the predetermined threshold value is a predetermined transmissivity value.

24. The method of claim 22, further comprising causing the cleaning assembly to illuminate a region proximate to the front surface of the window.

25. The method of claim 22, further comprising operating the cleaning assembly at a vibration frequency between 10 kHz and 30 kHz.

26. The method of claim 22 wherein the sensor is a multispectral imaging camera, and wherein the method further comprises imaging a region positioned beyond the front surface of the window with the multispectral imaging camera.

27. The method of claim 22 wherein the sensor is a proximity sensor, and wherein the method further comprises detecting proximity of mining material beyond the front surface of the window with the proximity sensor.

28. The method of claim 22, further comprising:

mounting the self-cleaning window device on the mining shovel bucket; and detecting, via the sensor, parameters associated with mining material entering and/or positioned within the mining shovel bucket.

29. The self-cleaning sensor system of claim 14 wherein the self-cleaning window device is removably attached to the sensor enclosure.

30. The self-cleaning sensor system of claim 14 wherein the self-cleaning window device is integrally formed with the sensor enclosure.

31. The self-cleaning sensor system of claim 14 wherein the cleaning assembly comprises a wiper configured to wipe debris from the front surface of the window.

32. The self-cleaning sensor system of claim 14 wherein the cleaning assembly comprises a nozzle configured to spray fluid to remove debris from the front surface of the window.

33. The self-cleaning sensor system of claim 14 wherein the cleaning assembly comprises a movable film positioned along the front surface of the window, wherein the movable film is configured to collect and transport debris away from a front surface of the window.

34. The self-cleaning sensor system of claim 15 wherein the self-cleaning window device is removably attached to the sensor enclosure.

35. The self-cleaning sensor system of claim 15 wherein the self-cleaning window device is integrally formed with the sensor enclosure.

36. The self-cleaning sensor system of claim 15 wherein the cleaning assembly comprises a wiper configured to wipe debris from the front surface of the window.

37. The self-cleaning sensor system of claim 15 wherein the cleaning assembly comprises a nozzle configured to spray fluid to remove debris from the front surface of the window.

38. The self-cleaning sensor system of claim 15 wherein the cleaning assembly comprises a movable film positioned along the front surface of the window, wherein the movable film is configured to collect and transport debris away from a front surface of the window.

39. The self-cleaning sensor system of claim 17 wherein the self-cleaning window device is removably attached to the sensor enclosure.

40. The self-cleaning sensor system of claim 17 wherein the self-cleaning window device is integrally formed with the sensor enclosure.

41. The self-cleaning sensor system of claim 17 wherein the cleaning assembly comprises a wiper configured to wipe debris from the front surface of the window.

42. The self-cleaning sensor system of claim 17 wherein the cleaning assembly comprises a nozzle configured to spray fluid to remove debris from the front surface of the window.

43. The self-cleaning sensor system of claim 17 wherein the cleaning assembly comprises a movable film positioned along the front surface of the window, wherein the movable film is configured to collect and transport debris away from a front surface of the window.

44. The self-cleaning sensor system of claim 18 wherein the self-cleaning window device is removably attached to the sensor enclosure.

45. The self-cleaning sensor system of claim 18 wherein the self-cleaning window device is integrally formed with the sensor enclosure.

46. The self-cleaning sensor system of claim 18 wherein the cleaning assembly comprises a wiper configured to wipe debris from the front surface of the window.

47. The self-cleaning sensor system of claim 18 wherein the cleaning assembly comprises a nozzle configured to spray fluid to remove debris from the front surface of the window.

48. The self-cleaning sensor system of claim 18 wherein the cleaning assembly comprises a movable film positioned along the front surface of the window, wherein the movable film is configured to collect and transport debris away from a front surface of the window.

* * * * *